United States Patent
Miyazaki (10) Patent No.: US 7,387,142 B2
(45) Date of Patent: Jun. 17, 2008

(54) PNEUMATIC TIRE WITH RIM PROTECTOR

(75) Inventor: Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 11/361,596

(22) Filed: Feb. 24, 2006

(65) Prior Publication Data

US 2007/0029021 A1   Feb. 8, 2007

(30) Foreign Application Priority Data

Aug. 4, 2005   (JP) .............................. 2005-226707

(51) Int. Cl.
- B60C 17/00 (2006.01)
- B60C 3/00 (2006.01)
- B60C 13/02 (2006.01)
- B60C 15/00 (2006.01)

(52) U.S. Cl. .................. 152/165; 152/454; 152/516; 152/539

(58) Field of Classification Search ............. 152/523, 152/544, DIG. 9, 165, 516, 166, 154, 513, 152/522, 539, 454
See application file for complete search history.

(56) References Cited

U.S. PATENT DOCUMENTS 3,983,920 A * 10/1976 Gardner et al. ......... 152/544 X 6,418,993 B1 * 7/2002 Sakamoto et al. ...... 152/523 X

FOREIGN PATENT DOCUMENTS

| JP | 06227216 A | * | 8/1994 |
| JP | 07047809 A | * | 2/1995 |
| JP | 2000-127717 A | | 5/2000 |
| JP | 2002059712 A | * | 2/2002 |

* cited by examiner

Primary Examiner—Adrienne C Johnstone
(74) Attorney, Agent, or Firm—The Webb Law Firm, P.C.

(57) ABSTRACT

A pneumatic tire with rim protectors protruding outwardly from the outer side of a tire a distance greater than the outer surface on at least one outer surface of the sidewalls from the bead portions toward the tread and continuously formed in the tire circumferential direction. The rim protectors have the first top portion protruding outwardly from the tire outer side a distance greater than the outer surface through a first hillside portion in a cross-sectional shape from the bead portions toward the tread and a second top portion protruding in a stepped state from the first top portion through the second hillside portion. The second hillside portion extends more to the tire inner side and connects a vertex of the first top portion and an end point in a tread side of a virtual arc on the outer surface of the sidewalls.

4 Claims, 8 Drawing Sheets

PNEUMATIC TIRE WITH RIM PROTECTOR

The description of this application claims benefit of priority based on Japanese Patent Application No. 2005-226707, the entire same contents of which are incorporated by reference herein.

BACKGROUND OF THE INVENTION

1. Field of the Invention

The present invention relates to improvement of rim protectors in a pneumatic tire and, in more detail, the present invention relates to a pneumatic tire in which both high speed cornering performance and durability at bead portions are improved while maintaining the rim protection property.

2. Description of the Prior Art

In order to enhance the rim protection property, it is desirable to enlarge the size of the rim protectors, however, it is known that when the size of the rim protectors is enlarged, the rigidity of the rim protectors increases, thereby degrading high speed cornering performance due to interference with rim flanges at the time of high speed cornering.

Conventionally, in order to further improve high speed cornering performance while protecting a rim, a pneumatic tire formed with not less than one circumferential fine groove extending in a tire circumferential direction as a means to decrease the rigidity of the rim protectors (Japanese Patent Laid-Open Publication No. 2000-127717) has been provided. By forming these circumferential fine grooves (slits) on the rim protectors, the rigidity at the time of high speed cornering has been alleviated and improvement in said performance has been attempted.

However, when the circumferential fine grooves (slits) are formed on rim protectors, bead durability is degraded. In addition, forming the circumferential fine grooves (slits) keeping shapes of rim protectors enlarged causes the bead durability to degrade since load around bead portions is heavy.

The object of the present invention is to provide a pneumatic tire in which both high speed cornering performance and durability at bead portions are improved, while maintaining the rim protection property.

SUMMARY OF THE INVENTION

In order to solve the above mentioned problems, the inventor has employed a pneumatic tire provided with a tread with a crown shape, a pair of bead portions, a pair of side walls connecting said tread and said bead portion, with rim protectors continuously formed in the tire circumferential direction and protruded more to the tire outer side than said outer surface on at least one outer surface of said pair of sidewalls from said bead portions toward said tread direction, wherein said rim protectors have the first top portion protruded most to the tire outer side from said outer surface through a first hillside portion in a cross-sectional shape from said bead portions toward said tread direction and the second top portion protruded in a stepped state from the first top portion through the second hillside portion, and said second hillside portion extends more to the tire inner side than a virtual line X which connects a vertex P of said first top portion and an end point E in a tread side of a virtual circular arc L on said outer surface of sidewalls on which said rim protectors are formed.

DETAILED DESCRIPTION OF THE INVENTION

An embodiment of a pneumatic tire according to the present invention will now be explained in detail. However, the present invention is not limited to the embodiment described below.

Figure 1:
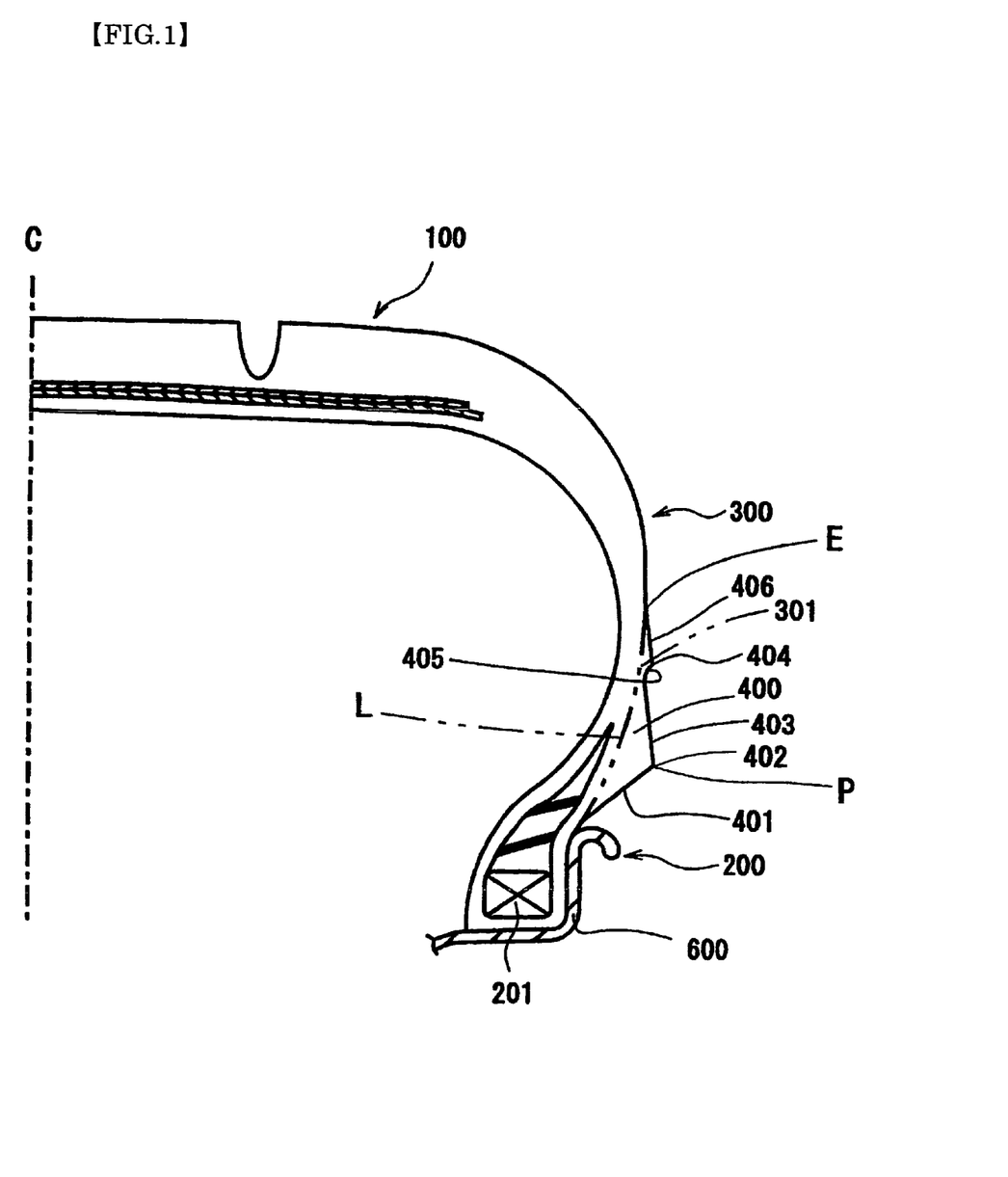
FIG. 1 is a schematic sectional view of a right half of a pneumatic tire showing one embodiment of the present invention.
Figure 2:
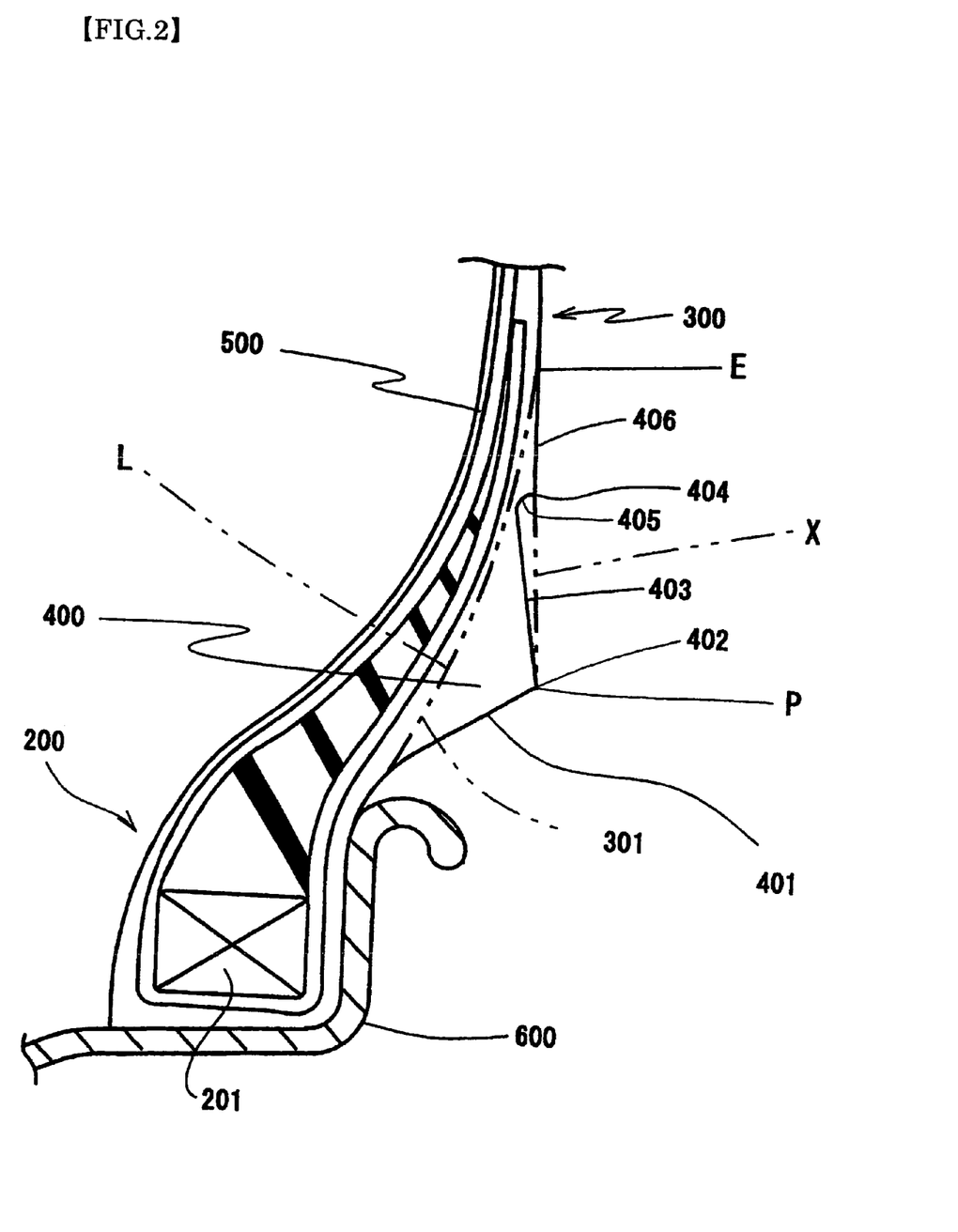
FIG. 2 is an enlarged sectional view in the vicinity of bead portions of said tire.
Figure 3:
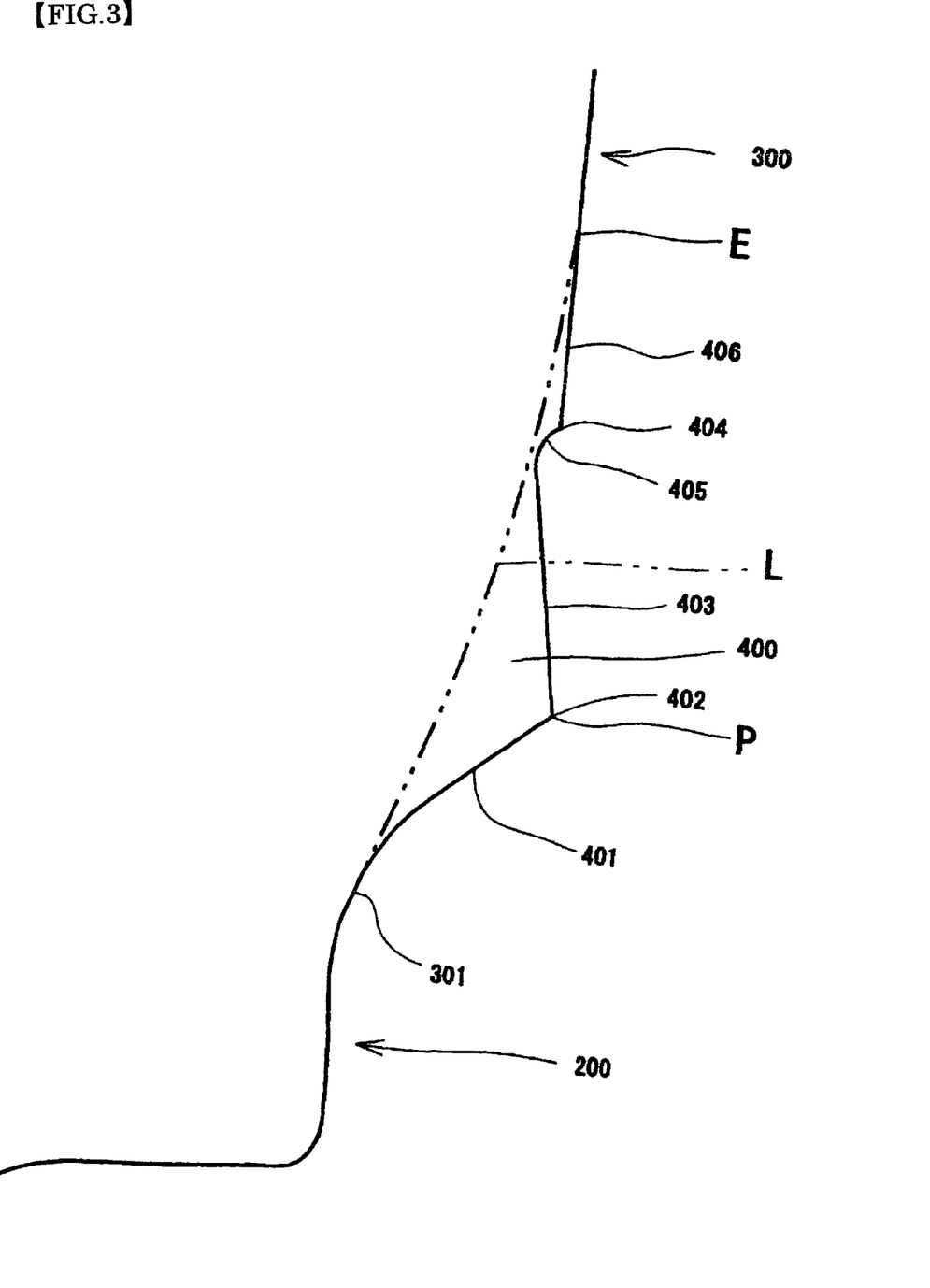
FIG. 3 is an enlarged schematic sectional view of a main part in the vicinity of rim protectors of said tire.

FIG. 1 is a schematic sectional view of a right half of a pneumatic tire showing one embodiment of the present invention, FIG. 2 is an enlarged sectional view in the vicinity of bead portions of said tire, and FIG. 3 is an enlarged schematic sectional view of a main part in the vicinity of rim protectors of said tire.

In FIG. 1, 100 shows a tread with a crown shape, 200 shows a bead portion, and 300 shows a side wall which connects said tread 100 and said bead portion. 201 shows a bead core. C shows a virtual line showing a tire equator.

As shown in the figures, in the present embodiment, at least on one of the outer surface 301 of said sidewall 300, rim protectors 400 protrude outwardly from the outer side of a tire a distance greater than said outer surface 301, extending from said bead portion 200 toward said tread 100 and formed continuously in the tire circumferential direction. 500 shows a carcass, and 600 shows a rim flange.

Rim protectors 400 of the present embodiment have the first top portion 402 protruded most to the tire outer side from said outer surface 301 through a first hillside portion 401 in a cross-sectional shape from said bead portions 200 toward said tread 100 direction and the second top portion 404 protruded in a stepped state from the first top portion 402 through the second hillside portion 403. In addition, 405 is a step portion composed of the second hillside portion 403 and the second top portion 404 and is formed in a round shape in the present embodiment as shown in figures.

In addition, as shown in FIGS. 2 and 3, said second hillside portion 403 extends more to the tire inner side than a virtual line X which connects a vertex P of said first top portion 402 and an end point E in a tread side of a virtual circular arc L on said outer surface 301 of sidewalls 300 on which said rim protectors 400 are formed. In addition, 406 is the third hillside position extending from the second hillside portion 404 to said tread side end point E.

Therefore, in the present embodiment, since a cross-section is formed stepwise (step portion 405) between said first top portion 402 and end point E in a tread side of a virtual circular arc L on said outer surface 301 of sidewalls 300, compared with the one without said cross-section, rigidity can be lowered by reducing the size of a cross-sectional shape. Therefore, high speed cornering performance is improved inhibiting the interference of these rim protectors 400 and rim flanges 600 at the time of high speed cornering.

In addition, according to the tire of the present embodiment, since fine grooves (slits) are not formed on the second hillside portion 403 in said tread 100 direction side from said first top portion 402, durability at bead portions is not degraded.

Further, as already mentioned, since rim protectors 400 of the present embodiment have the first top portion 402 protruded most to the tire outer side from said outer surface 301 through a first hillside portion 401 in a cross-sectional shape from said bead portions 200 toward said tread 100 direction and the second top portion 404 protruded in a stepped state from the first top portion 402 through the second hillside portion 403 with a second hillside portion 403 extending to the second top portion 404, rim protection performance is satisfactorily maintained in the first top portion 402.

Figure 6:
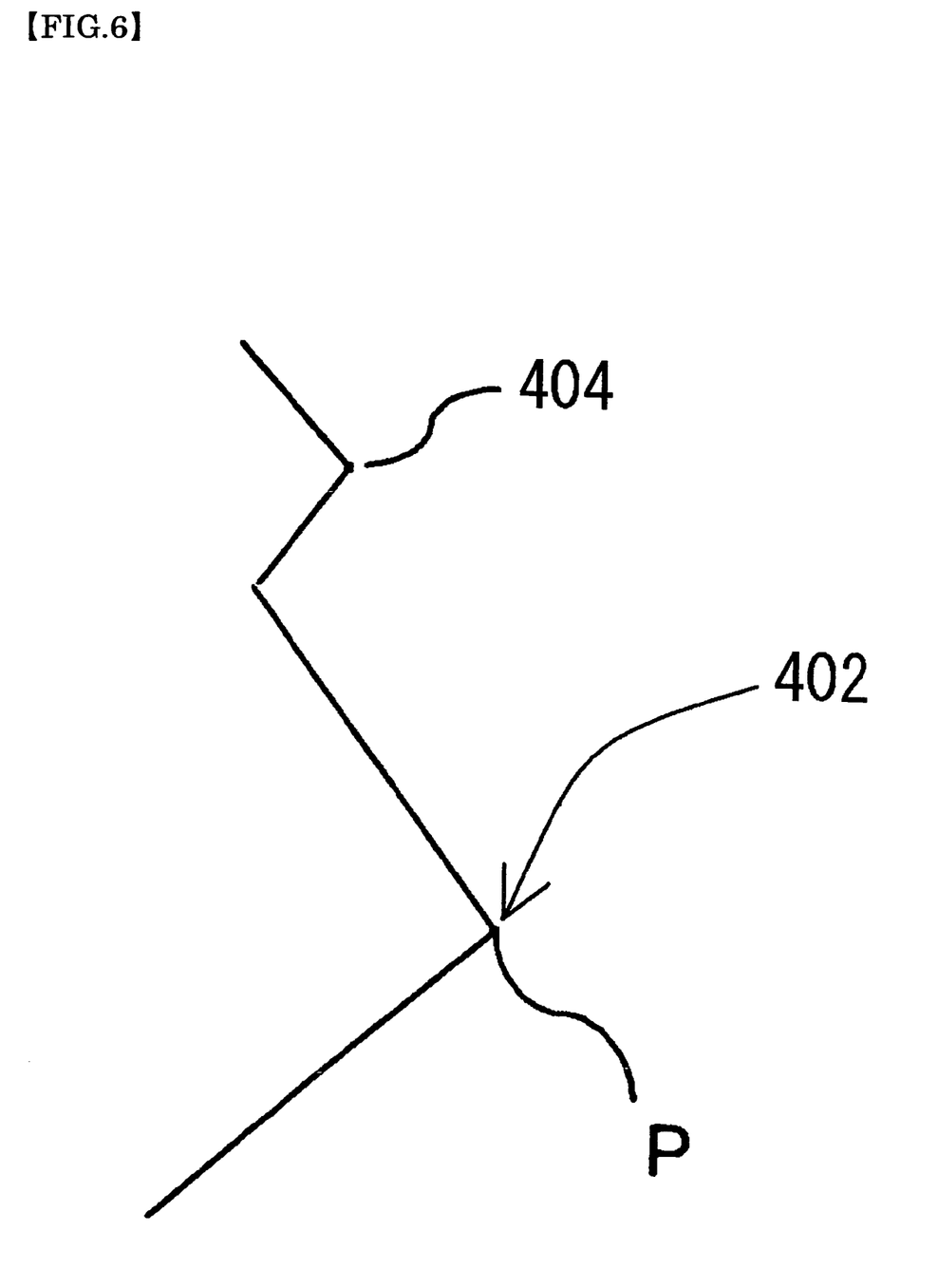
FIG. 6 is an enlarged schematic sectional view of a main part in the vicinity of rim protectors showing another embodiment at a step portion.
Figure 7:
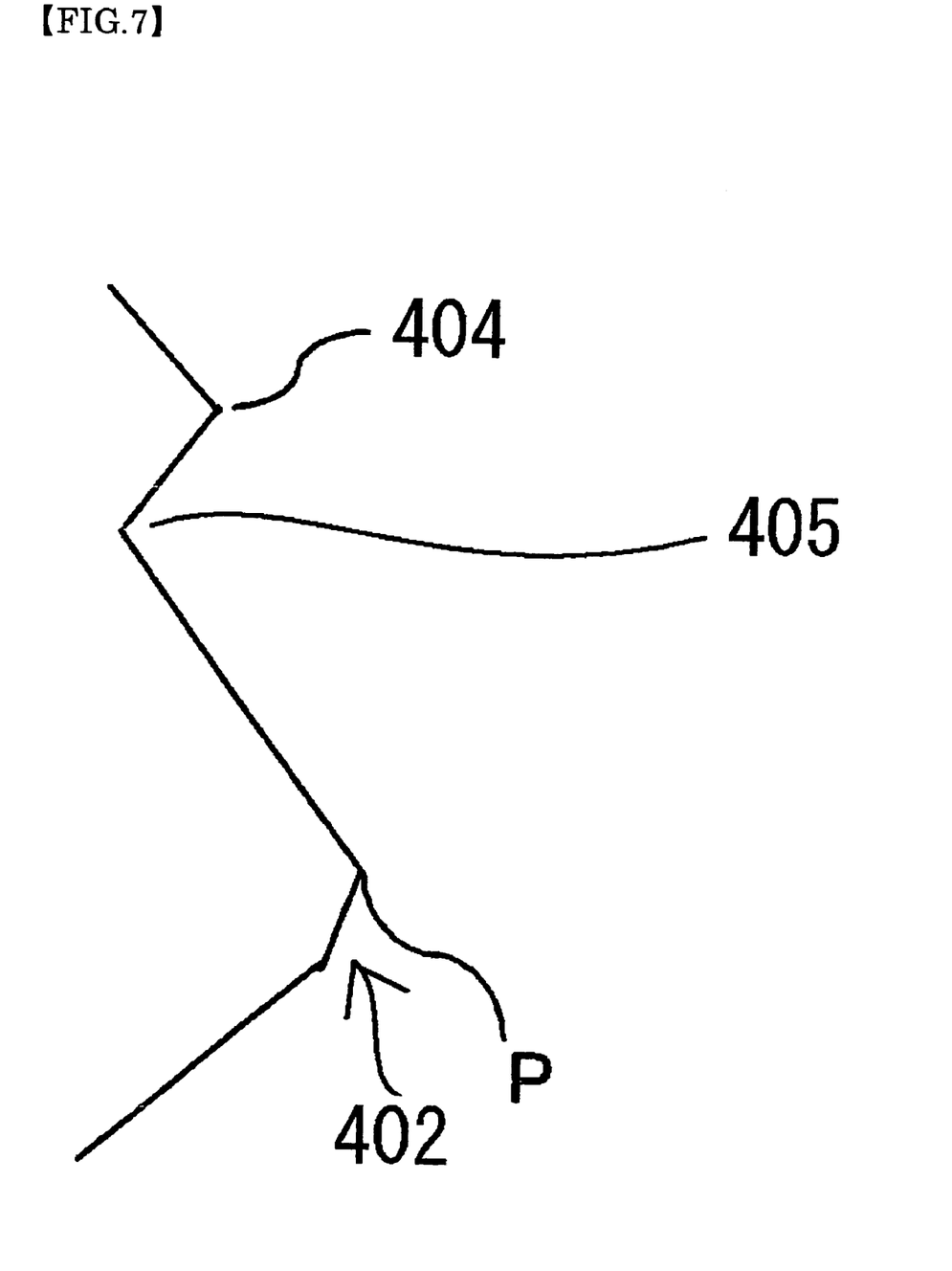
FIG. 7 is an enlarged schematic sectional view of a main part in the vicinity of rim protectors showing another embodiment at a top portion.
Figure 8:
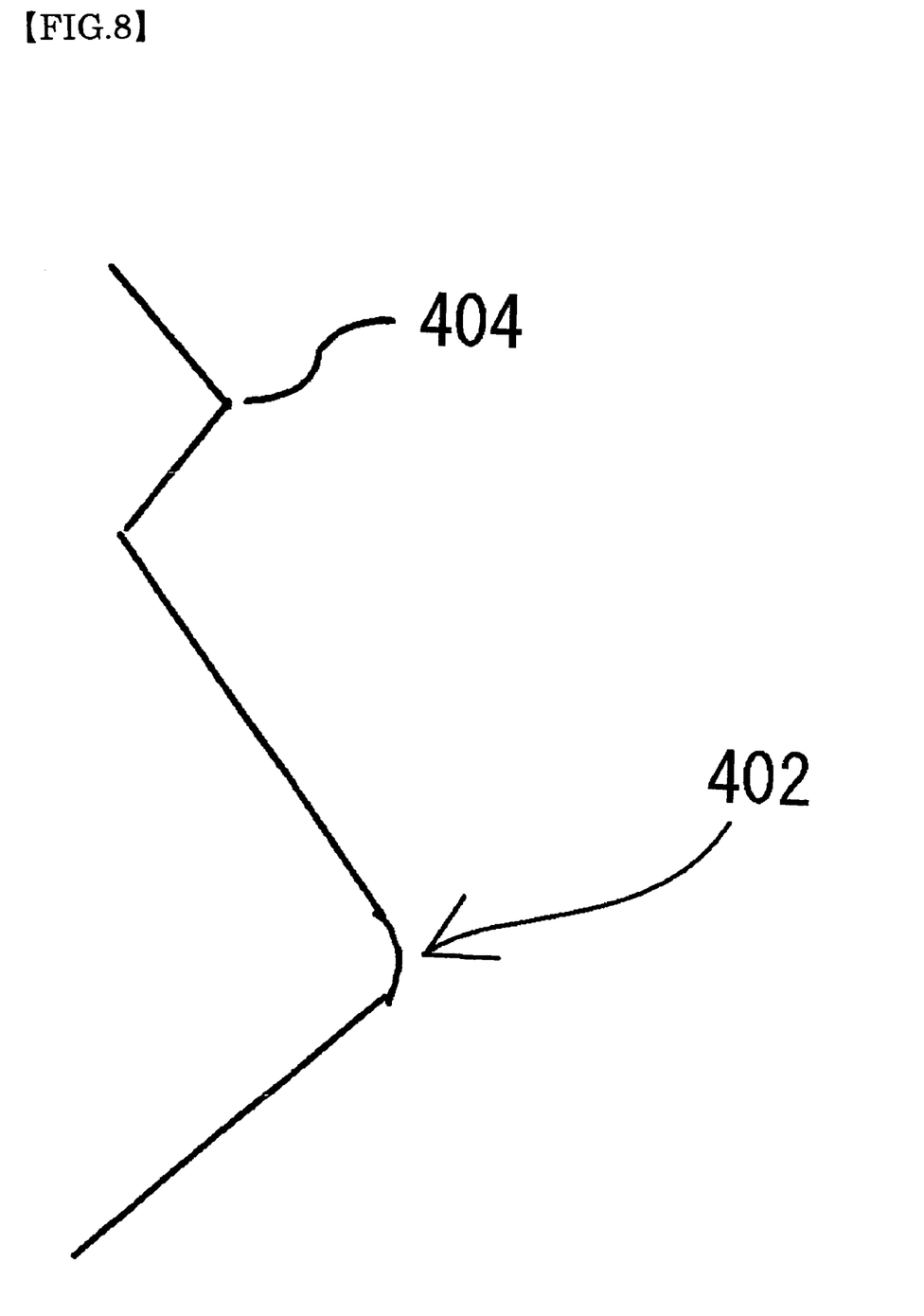
FIG. 8 is an enlarged schematic sectional view of a main part in the vicinity of rim protectors showing yet another embodiment at a top portion.

In addition, the present invention is not limited to the above mentioned embodiment. For example, a plurality of stepped portions extending in the tire circumferential direction and a plurality of top portions may be formed on an outer surface of rim protectors 400, by having the third top portion (not illustrated) protrude further in a stepped state (the second step portion) from the second top portion 404 through the third hillside portion 406. In addition, although a stepped portion 405 of said embodiment is composed of an R-shaped cross-section, as shown in FIG. 6, it may be composed of a substantially L-shaped or a substantially dog-legged cross-section, or the second top portion 404 may be composed of a cross-sectional shape having a vertex of that of the first top portion 402. In addition, although the first top portion 402 of said embodiment is formed of a vertex P, a cross-sectional shape of a top portion is not limited. Further, as shown in FIG. 7, a top portion can be made into a trapezoidal cross-section or an R-shaped cross-section. The same applies to the second top portion, and the like.

Figure 4:
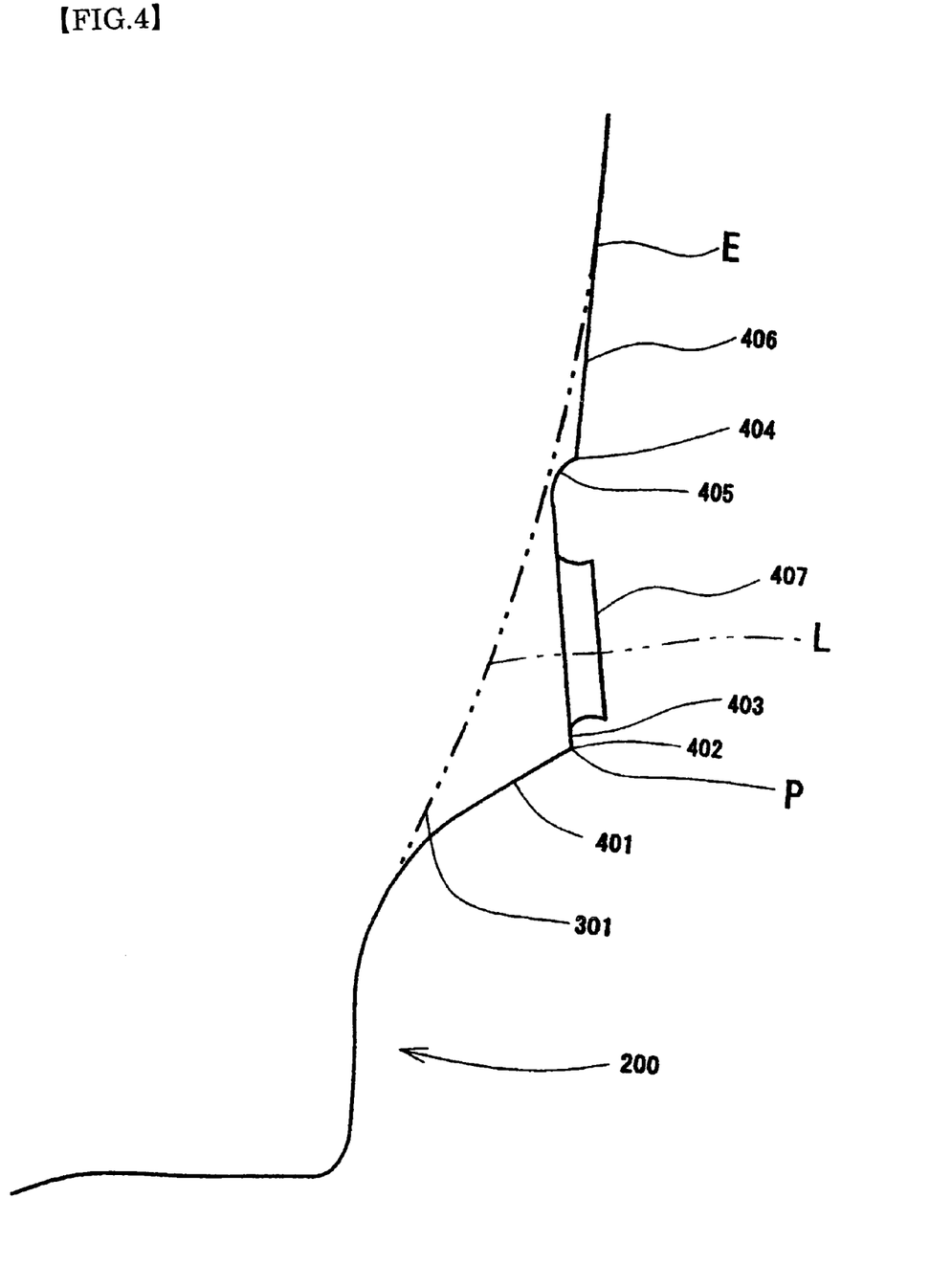
FIG. 4 is an enlarged schematic sectional view of a main part in the vicinity of rim protectors of a pneumatic tire showing another embodiment of the present invention.
Figure 5:
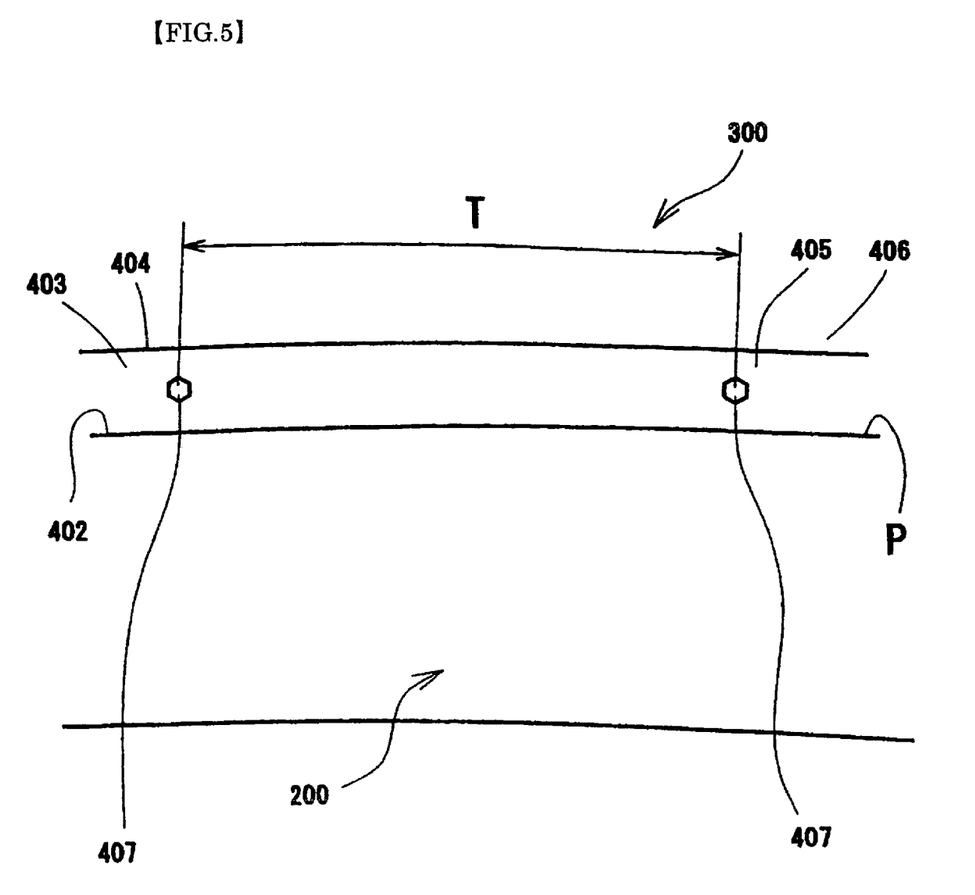
FIG. 5 is an enlarged schematic side view of a main part in the vicinity of rim protectors of said tire.

In addition, moreover, in order to improve the rim protection property, as shown in FIGS. 4 and 5, by forming a plurality of protrusions (convex portions) with intervals T along with tire circumferential direction, the rim protection property can further be improved. It is preferable that said intervals T are not greater than 160 mm. When a plurality of protrusions 407 (convex portions) are formed with intervals T greater than 160 mm, the rim protection property is degraded.

EXAMPLE

Radial tires related to Example 1 and Conventional Example 1 with structures shown in said FIGS. 1 to 3 and radial tires related to Example 2 with structures shown in FIGS. 4 and 5 were installed on a four-wheel-drive car with a 4000 cc engine and durability of a bead portion, high speed cornering performance, and rim protection property were evaluated respectively.

Tire size is 305/40R 22 for all the tires, and air pressure filled in a tire is 250 kPa. In addition, in tires shown in FIGS. 4 and 5, polygonal-shaped protrusions with a height of 3 mm and with a surface area of 100 mm$^2$ are provided with 60 mm intervals.

Tires of Comparative Example 1 are the same as the tires of Example 1 except that the tires do not have a stepped portion and that the second hillside portion extends on a virtual line X which connects a vertex P of said first top portion and an end point E in a tread side of a virtual circular arc L on said outer surface of sidewalls on which said rim protectors are formed in tires with a structure shown in said FIGS. 1 to 3.

(Durability at Bead Portions)

The distance at which failure near bead portions occurs was measured based on a test for durability of tires for cars prescribed in JIS D4230 and the measured values of reciprocal numbers of said distance were shown in indexes making 100 for the values of Comparative Example 1. The larger numbers show the better durability at bead portions.

(High Speed Cornering Performance)

High speed cornering performance was evaluated by a slalom run travel stability. In other words, a slalom travel was made at a speed of 100 km/h with 30 m intervals among pylons and the stability was evaluated by a sensory evaluation method in which the stability was evaluated on a scale of one to ten. Sensory evaluation points were shown in indexes making 100 for the values of Comparative Example 1. The larger numbers show the better high speed cornering performance.

(Rim Protection Property)

Tires approached to a curbstone at a speed of 5 km/h with an approach angle of 5° and after contacting with a curbstone, a car with the tires was driven by 5 m in parallel with the curbstone and the number of damaged rims were measured. The number was shown in indexes making reciprocal numbers of the number of damaged rims in the Comparative Example 1100. The larger numbers show the better rim protection property.

TABLE 1

| | Unit | Example 1 | Example 2 | Comparative Example 1 |
|---|---|---|---|---|
| Step Yes/No | — | Yes | Yes | No |
| protrusion Yes/No | — | No | Yes | No |
| Durability at bead portions | Index | 115 | 115 | 100 |
| High speed cornering performance | Index | 110 | 110 | 100 |
| Rim protection performance | Index | 99 | 115 | 100 |

Note)
Larger indexes show better evaluation results.

Table 1 shows the results. From Table 1, it is found that in the tire of the present Example 1, both high speed cornering performance and durability at bead portions are improved while rim protection property is maintained.

In short, as mentioned above, in the present invention, by forming a cross-sectional surface in a stepped state from said first top portion to an end portion E in a tread side of a virtual circular arc L on a surface of said side wall outer side, compared with pneumatic tires which do not have said cross-sectional surfaces, the cross-sectional shape of rim protectors can be kept small and the rigidity can be lowered, thereby improving high speed cornering performance suppressing an interference with rim flanges at the time of high speed cornering. Further, when said fine grooves (slits) are not formed from said first top portion to the second hillside portion of said tread direction side, durability at bead portions is not degraded as seen in the Japanese Patent Laid-Open Publication No. 2000-127717. Further, since the rim protectors of the present invention have the first top portion protruded most to the tire outer side from said outer surface through a first hillside portion in a cross-sectional shape from said bead portions toward said tread direction and the second top portion protruded in a stepped state from the first top portion through the second hillside portion with a second hillside portion extending to the second top portion, rim protection property is satisfactorily maintained at the first top portion.

What is claimed is:

1. A pneumatic tire provided with a tread with a crown shape, a pair of bead portions, a pair of sidewalls connecting said tread and said bead portion, with rim protectors continuously formed in the tire circumferential direction and which protrude outwardly from an outer side of the tire a distance greater than an outer surface of the sidewall, formed on at least one outer surface of said pair of sidewalls extending from said bead portions toward said tread direction, wherein said rim protectors have a first top portion protruded most to the tire outer side from said outer surface through a first hillside portion in a cross-sectional shape from said bead portions toward said tread direction a second top portion protruded in a stepped state from the first top portion through a second hillside portion, and said second hillside portion extending more to a tire inner side than a virtual line X which connects a vertex P of said first top portion and an end point E in a thread side of a virtual circular arc L on said outer surface of sidewalls on which said rim protectors are form; and wherein a step portion of the second hillside portion extends to the second top portion and is formed in a round shape.

2. The pneumatic tire as set forth in claim 1, wherein said pneumatic tire has a third top portion protruded in a stepped state from said second top portion through a third hillside portion.

3. The pneumatic tire as set forth in claim 1, wherein protrusion is formed with intervals along the tire circumferential direction in said second hillside portion.

4. The pneumatic tire as set forth in claim 2, wherein protrusion is formed with intervals along the tire circumferential direction in said second hillside portion.

* * * * *